United States Patent
Hecht et al.

(10) Patent No.: US 12,443,931 B1
(45) Date of Patent: *Oct. 14, 2025

(54) SYSTEMS AND METHODS FOR FUNDS TRANSFERS VIA A FEDERATED DIRECTORY

(71) Applicant: Wells Fargo Bank, N.A., San Francisco, CA (US)

(72) Inventors: Alan W. Hecht, Chanhassen, MN (US); Azita Asefi, Vacaville, CA (US); Ann M. Kirk, Deerwood, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,587

(22) Filed: Nov. 14, 2022

Related U.S. Application Data

(63) Continuation of application No. 17/240,296, filed on Apr. 26, 2021, now Pat. No. 11,501,270, which is a
(Continued)

(51) Int. Cl.
*G06Q 30/00* (2023.01)
*G06Q 20/10* (2012.01)
(Continued)

(52) U.S. Cl.
CPC .......... *G06Q 20/10* (2013.01); *G06Q 20/102* (2013.01); *G06Q 20/223* (2013.01); *G06Q 20/3223* (2013.01); *H04W 4/12* (2013.01)

(58) Field of Classification Search
CPC .................................................... G06Q 20/10
(Continued)

(56) References Cited

U.S. PATENT DOCUMENTS

| 10,318,936 | B2 | 6/2019 | Muthu et al. |
| 10,607,219 | B2 | 3/2020 | Ciurea |

(Continued)

OTHER PUBLICATIONS

ProQuestDialog NPL Search History.*
(Continued)

*Primary Examiner* — John H. Holly
(74) *Attorney, Agent, or Firm* — Foley & Lardner LLP

(57) ABSTRACT

A system, method, and apparatus for interdirectory funds transfers is provided. A method includes: receiving data from two or more payment directories, the data comprising information pertaining to a plurality of users, each of which are enrolled with at least one of the two or more peer-to-peer payment directories. The method includes receiving, by the federated directory management computer system, a request for a fund transfer to a payee and determining, by the federated directory management computer system based on the received data and the request, that the fund transfer is either an interdirectory transfer or an intradirectory transfer. The method includes identifying, by the federated directory management computer system based on the determination, a payment rail for the fund transfer and processing, by the federated directory management computer system based on the determination, the fund transfer via the identified fund rail.

19 Claims, 3 Drawing Sheets

Related U.S. Application Data continuation of application No. 15/345,832, filed on Nov. 8, 2016, now Pat. No. 10,990,936.

(60) Provisional application No. 62/267,119, filed on Dec. 14, 2015.

(51) Int. Cl.
*G06Q 20/22* (2012.01)
*G06Q 20/32* (2012.01)
*H04W 4/12* (2009.01)

(58) Field of Classification Search
USPC ............ 705/39, 1.1, 41, 44, 64, 40, 7.29; 713/156
See application file for complete search history.

(56) References Cited

U.S. PATENT DOCUMENTS

| | | | |
|---|---|---|---|
| 2003/0004867 A1* | 1/2003 | Kight | G06Q 20/04 705/39 |
| 2013/0060708 A1 | 3/2013 | Oskolkov et al. | |
| 2013/0132275 A1 | 5/2013 | Enzaldo et al. | |
| 2013/0238492 A1* | 9/2013 | Muthu | G06Q 20/405 705/39 |
| 2013/0275301 A1 | 10/2013 | Lehman et al. | |
| 2014/0089195 A1 | 3/2014 | Ward et al. | |
| 2015/0112866 A1 | 4/2015 | Muthu et al. | |
| 2016/0019517 A1 | 1/2016 | Kirsh et al. | |
| 2016/0132886 A1 | 5/2016 | Burke et al. | |
| 2016/0189119 A1 | 6/2016 | Bowman et al. | |

OTHER PUBLICATIONS

"Payment, clearing and settlement systems in the United States, CPSS—Red Book, 2012, 490-498" (Year: 2012).

"Richard Gendal Brown, A simple explanation of how money moves around the banking system, 2013, https://gendal.me/2013/11/24/a-simple-explanation-of-how-money-moves-around-the-banking-system/" (Year: 2013).

NPL Search History.

* cited by examiner

SYSTEMS AND METHODS FOR FUNDS TRANSFERS VIA A FEDERATED DIRECTORY

CROSS-REFERENCE TO RELATED PATENT APPLICATIONS

This application is a continuation of U.S. patent application Ser. No. 17/240,396, titled "SYSTEMS AND METHODS FOR FUNDS TRANSFERS VIA A FEDERATED DIRECTORY," filed Apr. 26, 2021, which is a continuation of U.S. patent application Ser. No. 15/345,832, titled "SYSTEMS AND METHODS FOR FUNDS TRANSFERS VIA A FEDERATED DIRECTORY," filed Nov. 8, 2016, which claims priority to U.S. Provisional Patent Application No. 62/267,119 titled "SYSTEMS AND METHODS FOR FUNDS TRANSFERS VIA A FEDERATED DIRECTORY" filed Dec. 14, 2015, each of which are incorporated herein by reference in their entireties.

TECHNICAL FIELD

Embodiments of the present disclosure relate generally to the field of funds transfers. More particularly, the systems, methods, and apparatuses relate to electronic peer-to-peer (P2P), peer-to-business (P2B), business-to-peer (B2P), and business-to-business (B2B) fund transfers.

BACKGROUND

Parties using peer-to-peer (P2P), peer-to-business (P2B), and business-to-business (B2B) funds transfer systems desire an ability to transfer the funds securely and quickly. In this regard, funds transfer systems may utilize cash, check, and/or digital payments (e.g., electronic wires, automated clearing house exchanges, etc.). However, digital payments in particular typically require some type of authentication for the payor (i.e., person or entity sending the funds) and identification of the payee (i.e., the person or entity receiving the funds). Authentication and identification can be complex, time-consuming, and in turn undesirable for payor and payees. Accordingly, enhanced funds transfer systems and methods are needed.

SUMMARY

A first exemplary embodiment relates to a system for interdirectory funds transfers. The system includes: two or more peer-to-peer payment directories; and a federated directory management system communicably and operatively coupled to the two or more peer-to-peer payment directories. According to one embodiment, the federated directory management system is structured to: receive data from each of the two or more peer-to-peer payment directories; normalize the data to create a uniform database; receive a fund transfer request; query the uniform database to identify a payee; determine the payee belongs to a payment directory different from a payment directory of a payor based on the identity of the payee; and facilitate interdirectory processing of the fund transfer request.

A second exemplary embodiment relates to a method. The method includes receiving, by a federated directory management computer system, data from two or more payment directories; normalizing, by the federated directory management computer system, the received data to create a uniform database; receiving, by the federated directory management computer system, a fund transfer request regarding a payor and a payee; querying, by the federated directory management computer system, the uniform database to identify the payee; determining, by the federated directory management computer system, the payee belongs to a payment directory different from a payment directory of a payor based on the identity of the payee; and causing, by the federated directory management computer system, the fund transfer.

A third exemplary embodiment relates to a federated directory management computer system structured to facilitate and enable funds transfer between two or more different payment directories. According to one embodiment, the federated directory management computer system includes normalization logic structured to receive data from each of the two more different payment directories and normalize the data to create a uniform database; a rules engine structured to identify and resolve a data collision based on the data received from the two or more different payment directories; request logic structured to receive a fund transfer request regarding a payor and a payee, and query the uniform database to identify the payee; and a communication circuit structured to facilitate and enable the requested fund transfer based on an identification of the payee.

These and other features, together with the organization and manner of operation thereof, will become apparent from the following detailed description when taken in conjunction with the accompanying drawings.

DETAILED DESCRIPTION

Figure 1:
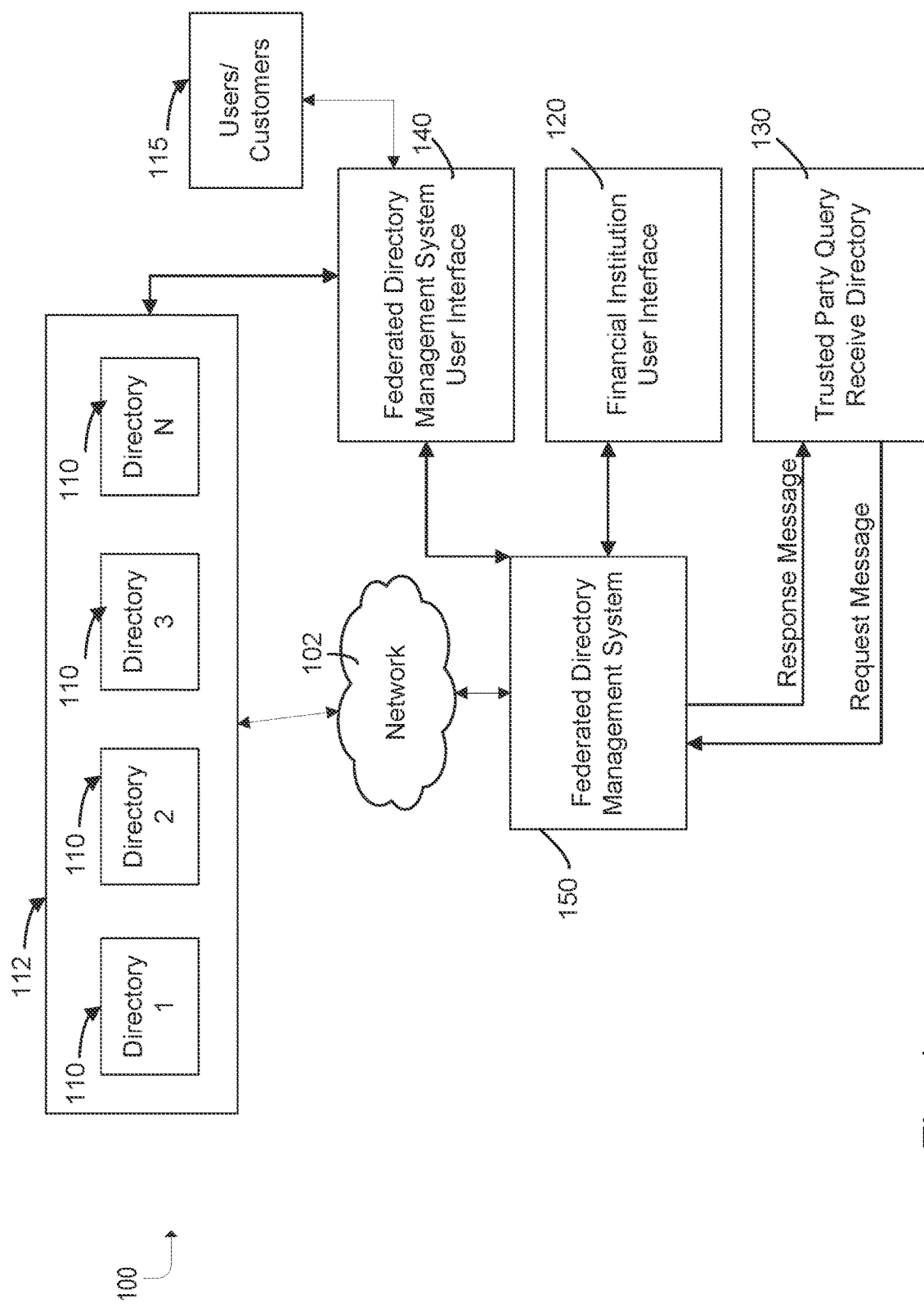
FIG. 1 is a schematic diagram of a fund transfer system, according to an example embodiment.

Referring to the Figures generally, various systems, methods, and apparatuses relate to a federated directory management system that facilitates funds transfers. More particularly, the various systems, methods, and apparatuses relate to a federated directory management system that consolidates data from two or more peer-to-peer (P2P) directories or payment devices to facilitate and manage funds transfers across different P2P directories. Currently, many different P2P payment devices exist: ClearXchange, PayPal, Venmo, Popmoney, Square Cash, Dwolla, and so on. However, these P2P payment devices require the sender (i.e., payor) and recipient (i.e., payee) to be a part of that same P2P payment device. If the recipient is not a member of that particular P2P payment device, the particular P2P payment device may send a message to the recipient to join or enroll in order to start receiving and sending funds. Due to the quantity and variety of P2P payment devices, people may disfavor having to enroll in all of these P2P payment devices. In this regard, each P2P payment device may require its own credentials (e.g., username and password) such that a user may have a plurality of credentials specific to each P2P payment device. Not only is this cumbersome, but the user may have a difficult time keeping track of each credential for each P2P payment device. Further, some users may use the same credentials for each P2P payment device, which may reduce the security associated with these P2P payment devices (e.g., if one credential is compromised, the user may have all their accounts at each P2P payment device compromised).

According to the present disclosure, a federated directory management system is coupled to the plurality of P2P payment devices (e.g., clearxchange, PayPal, Venmo, Popmoney, Square Cash, Dwolla, and so on). Each payment device includes a directory of its member users. Herein, in some instances, reference is made to users being members of directories, it being understand that the user is a member of the directory by virtue of the user being a member of the associated payment device. In operation, the federated directory management system may receive data from each directory. Due to the data having possibly and likely different characteristics (e.g., different data types, different data formats, different quantities of data, etc.), the federated directory management system may be structured to normalize the data. The normalization process may include formatting the data from each directory to be uniform, such that a uniform database may be generated that stores the combined data from each directory. The federated directory management system may also include a rules engine, wherein the rules engine may be structured to identify and resolve data collisions from one or more of the directories in the uniform database. For example, Person A may be a member of Directory A and use their phone number as a token for sending/receiving funds. However, recently, Person A may have switched phone numbers. Person B, who is a member of Directory B, may have then acquired Person A's previous phone number and enrolled that number with Directory B prior to Person A enrolling Person A's new phone number with Directory A. At this point, the rules engine may identify two identical tokens and apply one or more rules to resolve this "collision." For example, the rules engine may supply a message to Directory B informing Person B that that the particular phone number token is already taken/occupied. Or, the rules engine may provide messages to each of Directory A and Directory B in order to determine who should be the correct holder of the particular phone number-token. Beneficially, while a new phone number adjustment in Directory B alone may have been implemented seamlessly, in this federated environment, a collision may have occurred but for the activities of rules engine, which facilitates a relatively efficient integration process between the directories. Subsequently, a fund transfer request may be received by the federated directory management system, wherein the federated directory management systems facilitates processing the request.

An example may be described as follows. A payor, who belongs to Directory A, may desire to transfer funds to a payee. However, the payee is not a member of Directory A; rather, the payee is a member of Directory B. Accordingly, the funds transfer request may be received by the federated directory management system. The federated directory management system may query the uniform database to locate the payee and determine that the payee is a member of Directory B. The federated directory management system may then facilitate the funds transfer to the payee. Beneficially, such a process circumvents the need for the payee to join Directory A. To enable the funds transfer process, the payor's account may at least one of be a separate account supported by Directory A or be operatively coupled to Directory A and maintained by a financial institution associated with the payor. After locating the payee, the federated directory management system may provide a credit message to the account of the payor to retrieve and pass the funds to the account of the payee, which may be maintained by Directory B or by a financial institution linked to Directory B. The actual funds transfer may be accomplished via one or more predefined rules for at least one of the federated directory management system, the payor or payor's directory, and/or the payee or the payee's directory. For example, the payee may have designated that for Directory B, the payee only wants to receive funds via a wire transfer. In this regard and in the above example, the funds transfer may be accomplished via a wire transfer then. However, in other examples, other rules may designate/define how the actual payment occurs. Advantageously, the federated directory management system may enable and facilitate funds transfers between parties of different directories without requiring users to enroll with a plurality of P2P directories.

It should be understood that while the present disclosure is explained mainly in regard to P2P funds transfer, such a description is not meant to be limiting. The present disclosure also contemplates that the principles described herein may be applicable with business-to-business (B2B), business-to-person (B2P), and person-to-business (P2B) funds transfers as well. All such variations are intended to fall within the scope of the present disclosure.

Referring now to FIG. 1, a fund transfer system 100 is shown according to one embodiment. The fund transfer system 100 may be utilized by payors to send funds to payees and by payees to receive the funds from payors, e.g., via automatic clearing house (ACH), or in another manner (e.g., via a different rail where the term "rail" refers to how the funds are transferred such as via a wire, ACH, etc.). The payors (also referred to herein as the "sender") and payees (also referred to herein as the "receiver") may be individuals or business entities, such that the funds transfer system 100 may facilitate P2P, P2B, and/or B2B funds transfers. Moreover, the fund transfer system 100 may be used for both intradirectory transfers (i.e., transfers in which the payor and the recipient both have accounts at or associated with the same directory) and interdirectory transfers (i.e., transfers in which the payor and the recipient have accounts at or associated with different directories). Because the fund transfer system may provide interdirectory transfers, the fund transfer system 100 may also be referred to as a federated fund transfer system herein. In this regard, the federated fund transfer system (or environment) indicates that sender/recipient of funds may have accounts at multiple different financial institutions and directories.

The fund transfer system 100 may include, among other systems, a plurality of directories 112 comprising two or more directories 110, a trusted party query receive directory 130, a financial institution user interface 120, a federated directory management system user interface 140, and a federated directory management system 150, wherein the components of the system 100 may be communicably and operatively coupled over the network 102. Accordingly, the network 102 may provide and facilitate the exchange of communications (e.g., data, instructions, commands, values, etc.) via the systems and components of FIG. 1. Accordingly, the network 102 may include any network including any wired (e.g., Ethernet) and/or wireless networks (e.g., 802.11X, ZigBee, Bluetooth, Internet, etc.). In some embodiments, the network 102 may further include a proprietary banking network to provide secure or substantially secure communications (e.g., include cryptography characteristics).

The plurality of directories 112 may include two or more individual directories 110. In this example, the system includes a Directory 1, a Directory 2, a Directory 3, and a Directory N to indicate that a plurality of directories 112 may be included with the system 100. However, in other examples, the system 100 may include any number of directories. In one embodiment, the directory 110 may be structured as a P2P payment device directory. In this regard, the directory 110 may be structured as any P2P payment device directory including, but not limited to, Clearxchange, PayPal, Venmo, Square Cash, Dwolla, Snapcash, and the like.

Each directory 110 in the plurality of directories 112 may include a network interface for communicably and operatively coupling the directory 110 to the federated directory management system 150. Each directory 110 may also include a set of predefined rules or settings that designate the characteristics of the data transmitted and/or exchanged with the federated directory management system 150. In this regard, some directories may provide or exchange more and different types of data with the federated directory management system 150 than other directories.

Currently, each directory 110 operates in isolation. Beneficially and according to the present disclosure, the federated directory management system 150 facilitates the communicable and operative coupling between each directory 110 to facilitate fast, easy, and efficient funds transfers between users of each directory of the system 100.

In some embodiments, a fee may be imposed on each directory 110 to be a part of the system 100. In one embodiment, a periodic subscription fee (e.g., monthly, yearly, etc.) may be charged to the directories 110. In another embodiment, an interchange fee may be charged to at least one of the directories during an interdirectory funds transfer. In yet another embodiment, any other type/configuration of a fee may be used with the system 100.

In this regard, herein, each directory 110 is assumed to be "member directory." That is, the directories are assumed to follow established protocols for transferring funds using the fund transfer system 100. While three directories are shown in FIG. 1, it will be appreciated that there may be additional member directories. To become a "member directory," the directory may be required to register with the federated directory management system 150. Such registration may include the one or more fees, as described above. Further, each financial institution associated with each financial institution user interface 120 is assumed to be a "member financial institution." Membership may be predicated on joining the system 150, being a part or associated with a member directory 110, and any other protocol. Accordingly, similar to the member directories, a fee may be imposed on the member financial institutions as well.

As shown, the system 100 may include a financial institution user interface 120. While only one financial institution user interface 120 is shown, this is for exemplary purposes only. In operation, the system 100 may include a plurality of financial institution user interfaces for each financial institution that supports accounts at each member directory 110 of the system 100. In this regard, the financial institution user interface 120 may be operated by a financial institution that maintains accounts held by the sender (i.e., payor) and/or recipient (i.e., payee), such as demand deposit accounts, credit card accounts, home mortgage loans, student loans, and so on. The financial user interface may be structured as any type of user interface including, but not limited to, an Internet website, an application on a mobile device (e.g., a smartphone), and so on. The financial institution user interface 120 may facilitate the exchange of information with the federated directory management system 150 over the network 102. Examples of the information that may be exchanged includes, but is not limited to, an identification of a payor or payee, a request to transfer funds from a payor, an indication that an incoming funds transfer to a payee is forthcoming, and any other information indicative of and regarding the funds transfers between the directories 110 and the users themselves.

In one embodiment, the financial institution user interface 120 may only allow member financial institutions of the system 100 to observe customer aliases or tokens (e.g., phone number, email address, etc.) for funds transfers involving that particular financial institution (e.g., where the payor's source account is at the financial institution or where the payee's receiving account is at the financial institution). In this regard and in one embodiment, the financial institution, via the user interface 120, may only observe the public tokens of the payor and payee. A public token is a token that may be visible to the financial institution user interface 120 and other users. Examples of a public token may include, but are not limited to, an email address, a social token (e.g., Twitter handle, Facebook ID, etc.), a phone number, and any other unique and publicly or mostly publicly observable identifier for the user. In comparison, a private token may be invisible (or otherwise unknown) by the user itself and other users. An example of a private token may be a database identifier for utilization with a database of the financial institution to recall information regarding the particular user. Private and public tokens may utilize detokenization functions to decode the token to, e.g., determine the holder of that token (or account associated with that token, etc.).

According to another embodiment, the financial institution user interface 120 may only provide information indicative of a funds transfer when the payee is associated with that particular user interface. That is to say, the payor financial institution user interface may have restricted access to the particulars of the funds transfer.

As alluded to above, the financial institution user interface 120 may at least partly allow and provide for the exchange information with the federated directory management system 150. An example piece of information may be one or more rules regarding the funds transfers. The rules may define the type of rail (e.g., ACH, wire, etc.) that the financial institution uses when that financial institution is the sender and/or recipient. In this regard, such rules may define the funds transfer relationships between directories 110.

As shown, the system 100 also includes a trusted party query receive directory 130. The trusted party receive query directory 130 may be structured as a user interface for exchanging information with the federated directory management system 150. Accordingly, in one embodiment, the trusted party receive query directory 130 may be included with the federated directory management system 150. In another embodiment and as shown, the trusted party receive query directory 130 may be a separate component relative to the federated directory management system 150. In either embodiment, the trusted party receive query directory 130 may be communicably coupled to an interface (e.g., a website, an application running on a mobile device of a user, etc.), such that the trusted parties may provide requests/information via the interface to the federated directory management system.

As used herein and in regard to the trusted party query receive directory 130, the trusted party query receive directory 130 refers to an interface associated with a trusted party, wherein the trusted party includes at least one of a non-member directory, non-member user, and a non-member financial institution. In comparison, member directories, users/customers, and financial institutions may utilize at least one of the financial institution user interface 120 and the federated directory management system user interface 140 to communicate with the federated directory management system 150. Beneficially and in effort to provide ubiquity, Applicants have determined that establishment and creation of the trusted party query receive directory 130 may support ubiquity across member and non-member P2P payment systems. As an example, the trusted party may include a non-member P2P directory. Upon reception of a fund transfer request from a payor, the non-member P2P payment system may determine that the identified payee is not a part of their directory. Accordingly, the non-member P2P payment system may either one or both i) send a message to the payee to join or ii) provide a "request message" to the trusted party query receive directory 130. In response, the federated directory management system 150 may provide a "response message," wherein the response message may provide information regarding the payee if such information is stored in the uniform database (described below). Beneficially, such P2P payment systems may then identify the payee to facilitate the fund transfer request.

In this regard and generally speaking, non-members (users, P2P directories, etc.) may submit queries via the trusted party query receive directory 130, wherein the trusted party query receive directory 130 processes the queries and provides them as request messages to the federated directory management system 150, which in turn may provide a "response message." For example, these non-members may search for a token not in their own specific database. In this regard and beneficially, the uniform database is not being generally shared; however, and in effort to drive towards ubiquity, information may be selectively provided to facilitate funds transfers.

The trusted party receive query directory 130 may include a database for storing and categorizing request messages, a network interface for communicably and operatively coupling with the federated directory management system 150, and a processing unit for processing the request messages and for receiving responses from the federated directory management system 150. The trusted party receive query directory 130 may include logic for sorting through the request messages to, e.g., identify higher priority messages. The logic may also be structured to identify messages that have been answered in order to ensure or substantially ensure messages are not lost or missed. The logic may also be structured to categorize types of messages to route similar types to the appropriate personnel (e.g., via the federated directory management system user interface 140). Those of ordinary skill in the art will appreciate that the trusted party receive query directory 130 may include a variety of functions that facilitate the efficient processing of request messages and responses.

It should be understood that one or more restrictions may be imposed on the trusted party query receive directory 130. For example, each search may be charged fee. Or, in another example, only certain types of data may be requested/provided. Of course, the precise demarcations of the functions of the trusted party query receive directory 130 are meant to be broadly defined and interpreted.

The federated directory management system 150 may be communicably and operatively coupled to each of the components in the system 100 and structured to facilitate inter-directory funds transfer. As shown in FIG. 1, the federated directory management system 150 may include or be communicably and operatively coupled with a federated directory management system user interface 140. The user interface 140 may be structured to exchange information, data, values, message, and the like with the federated directory management system 150. In particular, the user interface 140 may be structured to allow an attendant of the federated directory management system 150 to control, observe, adjust, and otherwise manage the activities, operations, and processes of the federated directory management system 150. Accordingly, the federated directory management system user interface 140 may include any type of user interface that allows for the exchange of information, such that the user interface 140 may include, but is not limited to, a desktop or laptop computer, a mobile device (e.g., a smartphone, etc.), a tablet computer, a specialized controller, and so on. Further, the federated directory management system user interface 140 may include communication circuitry and any combination of machine-readable media for supporting, providing, and facilitating the exchange of information between the user interface 140 and the federated directory management system 150. All such variations are intended to fall within the scope of the present disclosure.

According to one embodiment, customers/users 115 of a directory 110 may provide instructions, queries, and/or requests via the user interface 140. More particularly, according to the present disclosure, the particulars of the fund transfer may be provided by the customers/users 115, wherein such particulars may control the aspects of the fund transfer. Accordingly, the particulars may neither be up to the directory 110 itself nor an associated financial institution. Beneficially, such a configuration may be appealing to customers/users 115 who desire an enhanced level of control over their fund transfers. Further, such a configuration may promote ubiquity among the P2P payment systems. Of course, in other embodiments, at least one of an associated financial institution and one or more directories may be provided with controlling authority over various operations of the federated directory management system 150. Accordingly, the embodiment where the customers/users 115 control operations of the fund transfer via the federated directory management system 150 is not meant to be limiting.

As alluded to above, the federated directory management system user interface 140 may receive/provide a variety of instructions, requests, and data from/to customers/users 115 (and, in certain embodiments, other entities of the system 100). An example may include a privacy setting. For example, users 115 may desire to keep certain aspects of their funds transfer private (e.g., primary account number). Accordingly, the users 115 of the directory 110 may provide a message to adjust and/or view one or more of their privacy settings.

Another example may be the fund transfer request itself. In this regard, the message may include an identification of a payee (e.g., by a public token associated with the payee), an amount, a time (e.g., when the funds need to be transferred by), a rail choice (e.g., ACH, wire, etc.), and any other information regarding the fund transfer request. In response, the federated directory management system 150 may provide a response message, wherein the response message may include a request for more information, a confirmation message, and any other information that may facilitate the funds transfer.

As yet another example, the users 115 may provide include any other input/information regarding use of the system 100. In this regard, the information may include any combination of the aforementioned information.

The federated directory management system 150 may be structured to facilitate payments or funds transfers between sender and recipients of the same or different directories 110. The federated directory management system 150 may be operated or owned by a third party entity or a joint venture from the member directories or member financial institutions in the pursuit of providing relatively easy interdirectory fund transfers. As another example, the federated directory management system 150 may be supported and provided by one or more of financial institutions (e.g., a bank), wherein the one or more financial institutions may or may not be associated with the financial institution user interface 120. Accordingly, one or more of the financial institutions may provide the structure and function that is described herein in regard to the federated directory management system 150.

Figure 2:
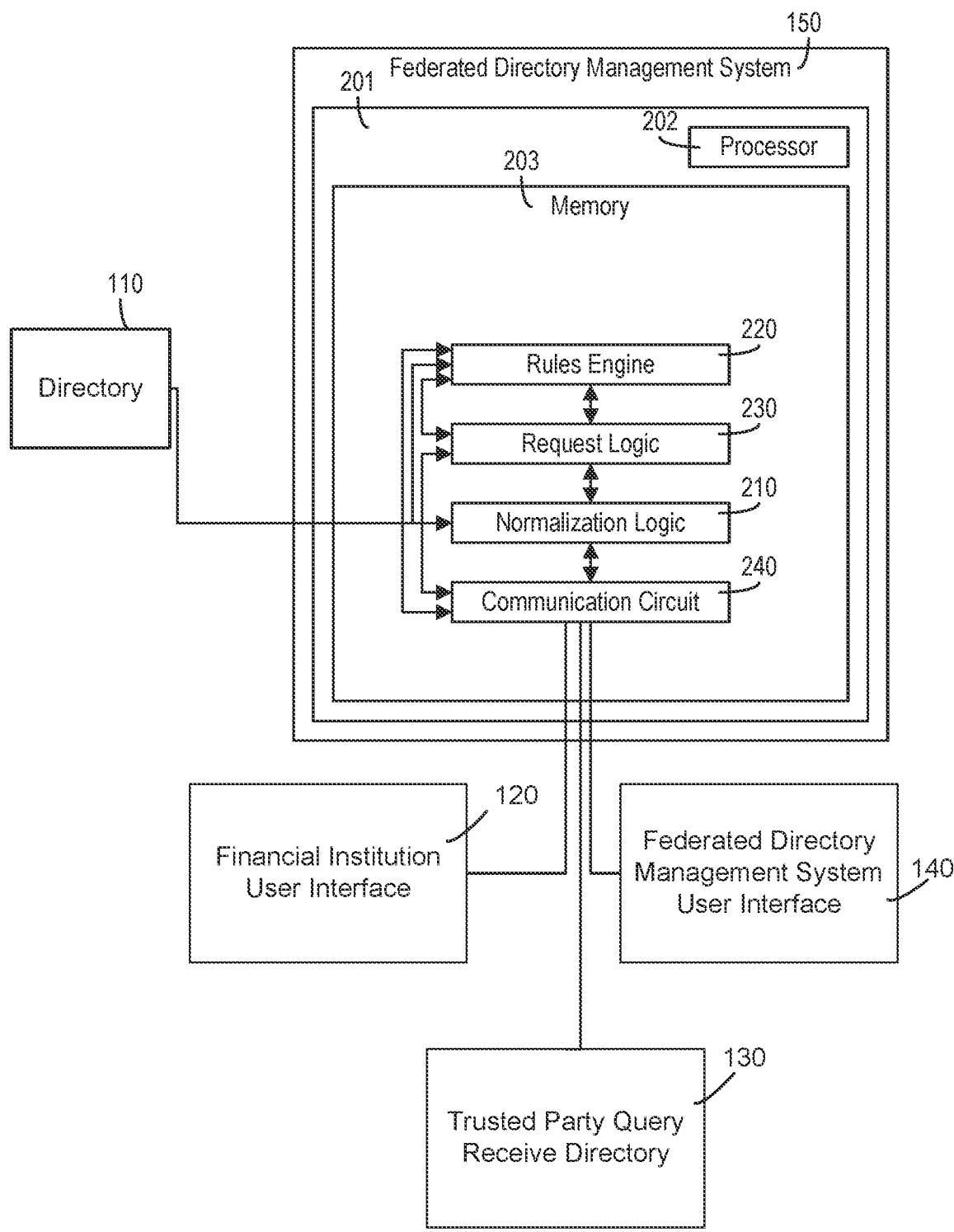
FIG. 2 is a schematic diagram of the federated directory management system used with the system of FIG. 1, according to an example embodiment.

Referring now to FIG. 2, an example structure of the federated directory management system 150 is shown, according to one embodiment. Generally speaking, the federated directory management system 150 is structured to integrate P2P directories 110, resolve data conflicts between the P2P directories 110, to in turn facilitate and support interdirectory funds transfers to users/entities associated with each member directory (and, in some embodiments, with users un-associated with a member directory). The federated directory management system 150 is shown to include a processing circuit 201 having a processor 202 and a memory 203.

The processor 202 may be implemented as a single general-purpose processor, a group of processors (e.g., a distributed server-based computing system), or other suitable electronic processing components. The one or more memory devices 203 (e.g., NVRAM, RAM, ROM, Flash Memory, hard disk storage, etc.) may store data and/or computer code for facilitating the various processes described herein. Thus, the one or more memory devices 203 may be communicably connected to the processor 202 and provide computer code or instructions to the processor 202 for executing the processes described herein in regard to the token management system 180. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The memory 203 is shown to include various logic and components for completing the activities described herein. More particularly, the memory 203 includes normalization logic 210, request logic 220, a rules engine 220, and a communication circuit 240. The components 210, 220, 230, and 240 are structured to facilitate interdirectory funds transfers. As an example and as described more fully herein below, a payor may be associated with a first P2P directory while a payee may be associated with a second P2P directory. Conventionally, the payee may be required to enroll with the first P2P directory in order to facilitate a funds transfer between the payor and payee. According to the present disclosure, the federated directory management system 150 facilitates the fund transfer between the payor and payee without requiring the payee to enroll with the first P2P directory of the payor. Beneficially, such a structure allows the interconnection of multiple directories yet does not require the users of each directory to join and create multiple credentials for each member directory. Advantageously and as a result, the users of the member directories may experience relatively easier P2P payments. Technically, the federated directory management system 150 may promote relatively faster P2P payments for situations where the payor and payee belong to different directories. This is due, at least in part, by the payee and/or payor not having to join/enroll with the directory of the payor and/or payee in order to facilitate the funds transfer. Moreover, such a structure may improve the functioning of the directories themselves yet not require changes to the structure of the directories except for being configured to selectively provide data to the federated directory management system 150. Thus, the present disclosure may improve the functionality of the computers in the system 100 itself as well as improving the field of electronic funds transfer by, e.g., providing convenience to a user.

While various components with particular functionality are shown in FIG. 2, it should be understood that the federated directory management system 150 may include any number of components for completing the activities described herein. For example, the activities of multiple components may be combined as a single component, as additional components with additional functionality may be included, etc. Further, it should be understood that the federated directory management system 150 may further control other activity beyond the scope of the present disclosure.

The normalization logic 210 may be structured to normalize data received from each directory 110. Accordingly, the normalization logic 210 may be communicably and operatively coupled to the directories 110. In this regard and in one embodiment, the normalization logic 210 may include communication circuitry (e.g., relays, network interfaces, etc.) that facilitate reception of the data from the directories 110. In another embodiment, the normalization logic 210 may include machine-readable media that provides instructions, commands, and messages to facilitate the reception of the data from the directories 110. In yet another embodiment, the normalization logic 210 may include any combination of hardware components, such as the communication circuitry, and machine-readable media.

As briefly mentioned above, the normalization logic 210 may be structured to normalize the data from each directory 110 to create a uniform database of data from each directory 110. As used herein, the term "normalization" with respect to the operation of the normalization logic 210 is meant to be broadly defined and generally refers to adjusting the values or data from each directory 110 to be of a common or uniform scale. In this regard, while the uniform database may include data from each directory 110, the data may be presented, categorized, arranged, and otherwise stored according to a commonality, such that the uniform database may be relatively easily searched and utilized. Moreover and beneficially, by normalizing the data at the federated directory management system 150, the system 100 advantageously does not or does very little imposition on the member directory 110 itself. For example, the federated directory management system 150 may therefore not impose various normalization rules on the data sent by each directory 110. Rather, the normalization logic 210 may handle substantially all types and formats of data transmitted from each directory 110 to create the uninform database.

The normalization process may include any type of normalization process using any combination of algorithms, formulas, look-up tables, models, and the like. In this regard, the normalization process may include converting a first data type to a second data type, assigning a data type to a specific category (i.e., routing the data to various predefined columns or categories for accurate tracking from each directory), and any other process that may be used to create a uniform database.

As shown, the rules engine 220 is communicably coupled to the normalization logic 210 and, in turn, structured to identify a data collision or potential data collision and apply one or more rules to resolve the data collision. As used herein and in regard to data collisions, the "rule" refers to a set of instructions that define the response for resolving a data collision. As used herein, the phrase "data collision" refers to data received by the normalization logic 210 from each directory 110 that may collide, conflict with, or otherwise contradict existing or recently received data. An example of a data collision includes a public token used in a first directory also used in a second directory, where the public token for the first directory is associated with a different user than the public token in the second directory. In this regard, identifying a payee by that public token could refer to either the user of the first directory or the user of the second directory, which is problematic and not desired. It should be understood that the aforementioned example of a data collision is not meant to be limiting as the present disclosure contemplates other and additional types of data collisions that result when integrating data from a two or more different directories 110.

In response to an identified data collision, the rules engine 220 may be structured to apply one or more rules to resolve the data collision. One rule may include the generation and transmission of a message to at least one of an attendant (e.g., a user 115) of federated directory management system 150 (e.g., to the user interface 140), the relevant directories 110, and/or the relevant financial institutions associated with at least one of the relevant directories and users. For example, if a public token is assigned to two different users for two different directories, the rules engine 220 may provide a message to one of the users to adjust/change their public token. The chosen user may be based on seniority (e.g., the user who has been a member longer may keep the public token while the more recent user may be required to change the token), a random selection, and any other determination. Another message may be to one or more of the directories 110 to instruct the relevant user to adjust their public token or another corrective action. Another rule may include the operation of one or more default actions. In the above example, the one or more default actions may include deactivating the public token associated with one of the users (e.g., the public token of the newer user may be deactivated, etc.). In this regard, the default action may promote continued operation of the federated directory management system 150 with respect to at least one identified data collision by foregoing or substantially foregoing the need for the relevant users and/or directories to take an affirmative action.

While the actions of the rules engine 220 above are described in regard to resolving data collisions or conflicts, it should be understood that the operations of the rules engine 220 may extend to beyond this scope.

As an example, the rules engine 220 may also include one or more predefined rules that govern or define funds transfers between users of the member directories 110. According to one embodiment and in accord with the aforementioned concept that the customer/user 115 controls operation of the fund transfer, the predefined rules may be provided by the customer/user 115 and applicable with that specific customer/user 115. According to an alternate embodiment, at least one of the financial institution, directory 110, customer/user 115, and federated directory management system 150 may control/define the one or more predefined rules.

The predefined rules may govern what type of rail (e.g., wire, ACH, etc.) is used for the fund transfer. The type of rail designated may be based on an identity of the payor's directory and the payee's directory, an identity of the payee's directory, an identity of the payor and/or payee, a speed required for the fund transfer (e.g., overnight, in two weeks, etc.), an amount in the fund transfer, a type of currency (e.g., cryptocurrency, cash, etc.), a time of day or calendar time of year for the fund transfer, an interchange fee, an identity of the financial institution associated with at least one of the payor and payee, and so on. As an example, if the payee belongs Directory 1, then the rail may be wire. However, if the payee belongs to Directory 2, then the designated rail may be ACH. Of course, as those of ordinary skill will appreciate, the precise rules that govern the rail can be based on one or more of a variety of factors with all such combinations intended to fall within the scope of the present disclosure.

The request logic 230 may be structured to receive a fund transfer request. In one embodiment, the fund transfer request may be received directly from a payor via the trusted party query receive directory 130. In another embodiment, the fund transfer request may be received from the directory 110 on behalf of the payor. Accordingly, in one embodiment, the request logic 230 may include communication circuitry (e.g., relays, wires, network interfaces, etc.) that facilitates the reception of the fund transfer request. In another embodiment, the request logic 230 includes machine-readable media that facilitates the reception of the fund transfer request from at least one of the aforementioned sources (e.g., the directory 110 directly and/or via the user interface 140). In yet another embodiment, the request logic 230 includes any combination of hardware components (e.g., communication circuitry) and machine-readable media.

The fund transfer request may include any piece of information used to facilitate the fund transfer. Accordingly, the fund transfer request may include, but is not limited to, identifying information regarding the payee such as a public token (e.g., an email address, phone number, etc.), an amount of funds to transfer, when the fund transfer is desired to happen, the identity of the source account, an identification of the directory that the payor belongs to or is associated with, and so on.

Table 1 below indicates routing rules/information that may be used by the request logic 230 and the federated directory management system 150 in general to effectuate the fund transfer request. As shown in Table 1 below, the fund transfer request may include several pieces of information, that may be used to facilitate the fund transfer. In particular, the payor/sender may provide information regarding the receiver, such as their token or alias. Further, the payor/sender may provide routing information via the user interface 140. As shown, such information includes a tag (i.e., a transaction identifier such as "rent"), an amount, a source payor alias/token, a settlement method (e.g., via a demand deposit account, etc.), a currency, and any other information. In response, the federated directory management system 150 may identify a directory owner and a financial institution associated with the directory owner. Subsequently, the information recited under "Financial Institution" in the Payment Destination column may be used to effectuate the transfer. It should be understood that the pieces of information shown in the table below are for exemplary purposes only and not meant to be limiting.

TABLE 1

| Receiver/ Payee | Customer Routing Information | Directory Owner | Payment Destination | Bank/Financial Institution Cross-Reference |
|---|---|---|---|---|
| Customer Alias/ token | Tag Amount ($) Source Payor | Owner | Directory Owner By Financial Institution | Payment id/ token Bank acct. |

TABLE 1-continued

| Receiver/Payee | Customer Routing Information | Directory Owner | Payment Destination | Bank/Financial Institution Cross-Reference |
|---|---|---|---|---|
| | Alias/token Settlement method Currency other | | Payment id/token Nickname Last 4 digits Speed Payee confirmation Other | |

The request logic 230 may also be structured to query the uniform database based on the fund transfer request. The query may be structured to identify information regarding the payee, wherein the identification may include, but is not limited to, a payee identity, a directory associated with the payee, and so on. In operation, the fund transfer request may include a public token associated with the payee. Using the identified public token, the request logic 230 may search the uniform database to identify and locate the payee. Upon identification, the request logic 230 may facilitate the fund transfer according to the one or more predefined rules.

The communication circuit 240 may be structured to provide, transmit, communicate, and/or otherwise exchange information, data, messages, values, and the like with at least one of the financial institution user interface 120, the federated directory management system user interface 140, a directory 110, and the trusted party query receive directory. Accordingly, in one embodiment, the communication circuit 240 may include communication circuitry, such as one or more relays, network interfaces (e.g., any type of network interface including wired and wireless interfaces for exchanging the information through the network interface), and the like. In another embodiment, the communication circuit 240 may include machine-readable media that facilitates the exchange the information. In yet another embodiment, the communication circuit 240 may include any combination of hardware components, such as communication circuitry, and machine-readable media.

In regard to the directory 110, the communication circuit 240 may provide messages regarding a frequency of transmission (e.g., when the directory 110 should transmit data to the federated directory management system 150), an identification of the payee belonging to the specific directory, when a fund transfer is scheduled, whether any fees are due based on the service, and so on.

In regard to the financial institution user interface, the communication circuit 240 may relay information regard operation of the federated directory management system 150. Such information may include, but is not limited to, a quantity of fund transfer transaction, a quantity of transactions per directory, current rules in place (e.g., rules regarding how to handle data collisions, rules regarding how to handle interdirectory fund transfer request, etc.), and any other information pertinent to the operation of the federated directory management system 150. Further, via the communication circuit 240, a third-party attendant of the federated directory management system 150 may provide information to adjust one or more rules, normalization processes, and any other instructions that may manage and control operation of the federated directory management system 150.

In regard to the financial institution user interface 140, the communication circuit 240 may provide token information regarding at least one of the payor and payee when the payor and/or payee is associated with the financial institution associated with the interface 140 and any other information that may be needed to facilitate the fund transfer request. Further, the communication circuit 240 may receive fund transfer rules/settings from one or more financial institutions that designate the particulars of the fund transfer request when the one or more financial institutions are used to support the transfer (assuming, in this embodiment, that the financial institution has authority to control certain operations of the fund transfer). For example, for Financial Institution 1, if the interdirectory transfer is from Directory 1 to Directory 2, the Financial Institution 1 may designate ACH as the rail for facilitating the transfer. However and still for Financial Institution 1, if the interdirectory transfer is from Directory 1 to Directory 3, the Financial Institution may designate wire as the rail for providing the transfer. In response, the rules engine 220 may update the fund transfer rules for that particular financial institution or provide the request to the federated directory management system user interface 140 to address (e.g., to provide a response message agreeing to the terms, to provide a response message changing the terms, and any other message to the financial institution to handle/address the request). Of course, as those of ordinary skill in the art will appreciate, the communication circuit 240 may exchange and provide a variety of messages/information with the financial institution user interface 140.

In regard to the trusted part query receive directory 130, the communication circuit 240 may facilitate the receiving of request messages and the providing of response messages to the trusted party query receive directory 130.

Figure 3:
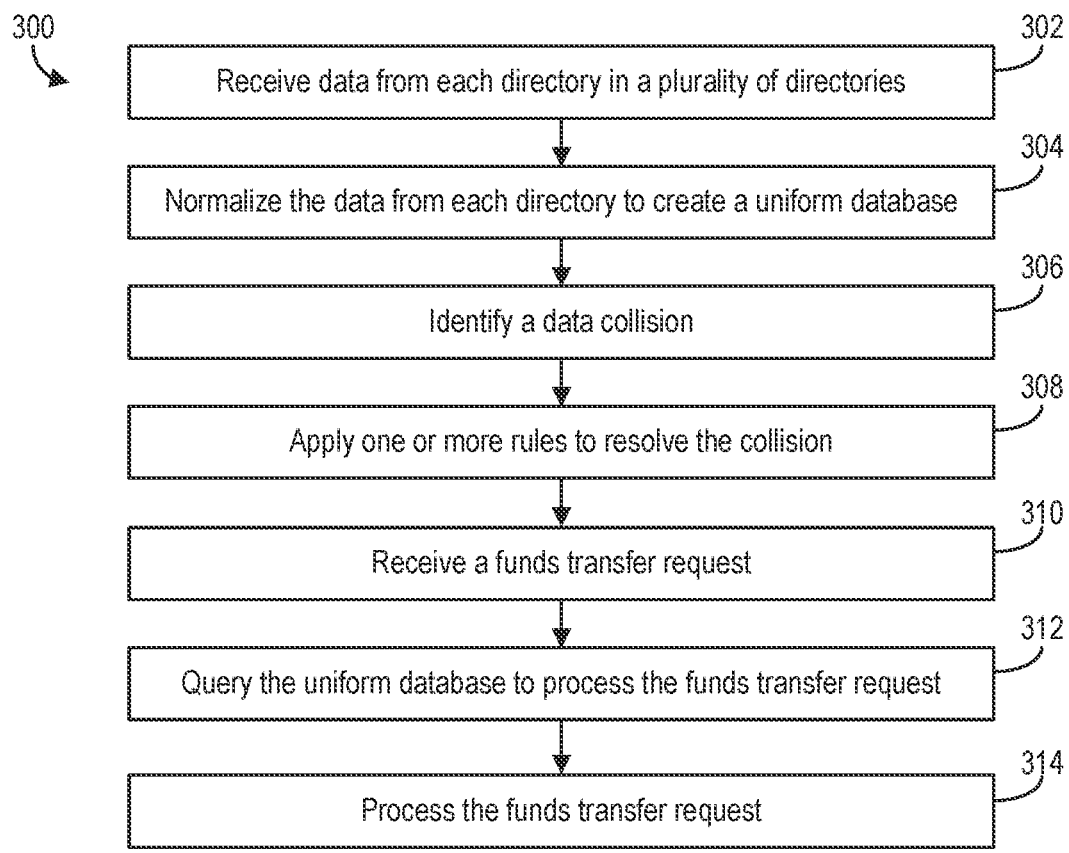
FIG. 3 is a flow diagram of a method of processing a funds transfer request using the federated directory management system of FIGS. 1-2, according to an example embodiment.

Referring now to FIG. 3 in combination with FIGS. 1-2, an example method of operation of federated directory management system 150 is shown, according to one embodiment. In this regard, because method 300 may be implemented with the system of FIGS. 1-2, reference may be made to one or more components of FIGS. 1-2 in explaining method 300.

At process 302, data from each directory of a plurality of directories is received. As mentioned above, in one embodiment, each directory in the plurality of directories may be P2P payment directories. Accordingly, the data may include, but is not limited to, information pertaining to each user enrolled with each directory (e.g., contact information, public token, bank account information, etc.).

At process 304, the data from each directory is normalized to create a uniform database. Because each directory may have different data storage protocols (e.g., which type of data is stored, how the data is stored, the file type of the data stored, and so on), the federated directory management system 150 may utilize one or more normalization processes to create consistency amongst the received data. For example, some data may be unique to a particular directory such that the federated directory management system 150 may exclude that data. In another example, the federated directory management system 150 may convert data types (e.g., file types) to be of a uniform file type. If data may be unable to be converted to a uniform file type, that data may be excluded from the conversion process or, in some instances, the uniform database. This process may include extracting the data and inserting the extracted data into the desired file type. In yet another example, the normalization process can include identifying and categorizing the same or similar types of data for importation into an umbrella category of the uniform database. Accordingly, those of ordinary skill in the art will appreciate that any type of normalization process may be performed at process 304 to normalize the data from each directory.

At process 306, a data collision is identified. In one embodiment, the data collision is identified after the data from each directory is normalized. In another embodiment, the data collision is identified during or pre-normalization of the data from each directory. As mentioned above, a "data collision" may refer to any type of collision or conflict amongst data received from the plurality of directories. For example, a data collision may include two different users having the same public token. As another example (in regard to when the directories may designate a rule regarding the fund transfer over or in place of the customers/users 115), a data collision may include a predefined fund transfer rule for a directory, wherein the predefined fund transfer rule may be in conflict with another fund transfer rule of another directory when fund transfers are requested between the two directories. As mentioned above and as those of ordinary skill in the art will appreciate, the number and type of data collisions is meant to be broadly interpreted, such that the aforementioned list is not meant to be exhaustive.

At process 308, one or more rules are applied to resolve the data collision. The one or more rules may be based on the type of data collision identified. For example for a data collision where two different users are making a claim to the same public token, the one or more rules may be different for that collision than the conflicting fund transfer rules/settings for two directories. The one or more rules may be prescribed by an attendant of the federated directory management system 150; by the directory 110 itself; by the financial institution associated with directory for the fund transfer; and/or some combination therewith.

In implementing the one or more rules, various implementation strategies may be used. For example, one implementation may include sending a message to the relevant parties (e.g., the payor/payee directories, financial institution, etc.) to resolve the collision. Another implementation may include automating or semi-automating various actions, such as a rule may predefine who receives the public token despite two users staking a claim to that token. Accordingly, as those of ordinary skill in the art will appreciate, the one or more rules applied can have a variety of effects and implemented via a variety of different mechanisms, with all such combinations intended to fall within the scope of the present disclosure.

At process 310, a fund transfer request is received. The fund transfer request may include any type of information for facilitating the fund transfer (e.g., an identification of a token of the payee, an amount, a timing, a rail if the payor is given the option, a source account, a directory associated with the payee if known, etc.).

At process 312, the uniform database is queried to process the fund transfer request. The query may be based on the information supplied in the fund transfer request, such as the public token of the payee. In one embodiment, identification of the payee may be performed simultaneously by the federated directory management system 150. In this regard, if the payee is not a member of the payor's directory, that particular directory may identify the payee as such. However, the federated directory management system 150 may then identify the payee as a member of another particular directory. In another embodiment, the federated directory management system 150 may first query the uniform database to determine which, if any, directory that the payee belongs to based on the information provided in the fund transfer request. If the payee belongs to the same directory as the payor, this information may be communicated back to the directory for processing as usual for the intradirectory funds transfer (process 314). However, if the payee belongs to a different directory, this information may be communicated each relevant directory.

At process 314, the fund transfer request is processed. Processing may include alerting the appropriate entities (e.g., the payor and payee directories, the financial institution(s) associated with the payor and payee, etc.) and processing the request according to a chosen or predefined rail (e.g., based on one or more rails) that transfers the funds. In this regard, processing may include any type of action or operation that facilitates the interdirectory P2P fund transfer.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A system for funds transfers, the system comprising:
two or more peer-to-peer payment directories; and
a federated directory management system communicably and operatively coupled to the two or more peer-to-peer payment directories, wherein a processing circuit of the federated directory management system is structured to:
  receive data from each of the two or more peer-to-peer payment directories, the received data comprising information pertaining to one or more users enrolled with at least one of the two or more peer-to-peer payment directories;
  normalize the received data to create a uniform database by:
    converting at least a first portion of the received data into a uniform file type and excluding a second portion of the received data, the second portion of the received data ineligible for conversion to the uniform file type; and
    providing the converted first portion of the received data to the uniform database and refraining from providing the second portion of the received data to the uniform database, the converted first portion of the received data provided to the uniform database according to a categorization based on a characteristic of the uniform file type;
  identify a data collision involving the normalized received data within the uniform database, the data collision including a data collision type;
  resolve, based on the data collision type and according to at least a first predefined rule stored by the processing circuit, the data collision;
  receive a request for a fund transfer to a payee;
  determine, based on a query of the normalized received data within the uniform database and the request, that the fund transfer is either an interdirectory transfer or an intradirectory transfer;

identify, based on the determination and according to at least a second predefined rule stored by the processing circuit, a payment rail for the fund transfer; and
process the fund transfer via the identified payment rail.

2. The system of claim 1, wherein the uniform database includes at least a third portion of the normalized received data, the third portion of the normalized received data categorized based on a characteristic of the normalized received data.

3. The system of claim 1, wherein the federated directory management system is further structured to:
identify the data collision in response to creating the uniform database.

4. The system of claim 3, wherein the data collision indicates a public token being associated with two different users.

5. The system of claim 4, wherein the public token includes one of an email address or a phone number.

6. The system of claim 5, wherein in response to the identified data collision, the federated directory management system is structured to transmit a message to an institution associated with at least one of the one or more users according to the first predefined rule stored by the processing circuit to resolve the data collision.

7. The system of claim 5, wherein in response to the identified data collision, the federated directory management system is structured to transmit a message to at least one of a user associated with the public token or a peer-to-peer payment directory associated the user, the message prompting the user to change the public token.

8. The system of claim 1, wherein the first predefined rule includes deactivating a public token associated with one of the one or more users.

9. The system of claim 1, wherein the request for the fund transfer is received from a third party query receive directory, the federated directory management system further structured to provide, to the third party query receive directory, a response message including information regarding the payee from a database.

10. A method, comprising:
receiving, by a processing circuit of a federated directory management computer system, data from two or more peer-to-peer payment directories, the data comprising information pertaining to a plurality of users, each of which are enrolled with at least one of the two or more peer-to-peer payment directories;
normalizing, by the processing circuit of the federated directory management computer system, the received data to create a uniform database by:
converting at least a first portion of the received data into a uniform file type and excluding a second portion of the received data, the second portion of the received data ineligible for conversion to the uniform file type; and
providing the converted first portion of the received data to the uniform database and refraining from providing the second portion of the received data to the uniform database, the converted first portion of the received data provided to the uniform database according to a categorization based on a characteristic of the uniform file type;
identifying, by the processing circuit of the federated directory management computer system, a data collision involving the normalized received data within the uniform database, the data collision including a data collision type;
resolving, by the processing circuit of the federated directory management computer system based on the data collision type and according to at least a first predefined rule stored by the processing circuit, the data collision;
receiving, by the processing circuit of the federated directory management computer system, a request for a fund transfer to a payee;
determining, by the processing circuit of the federated directory management computer system based on a query of the normalized received data within the uniform database and the request, that the fund transfer is either an interdirectory transfer or an intradirectory transfer;
identifying, by the processing circuit of the federated directory management computer system based on the determination and according to at least a second predefined rule stored by the processing circuit, a payment rail for the fund transfer; and
processing, by the processing circuit of the federated directory management computer system based on the determination, the fund transfer via the identified fund rail.

11. The method of claim 10, wherein the received data includes public token information regarding each user of the plurality of users that are enrolled with each of the two or more peer-to-peer payment directories.

12. The method of claim 11, wherein the data collision indicates two different users are associated with a same public token.

13. The method of claim 12, further comprising deactivating, by the federated directory management computer system according to the first predefined rule, the public token associated with one of the two different users to resolve the data collision.

14. The method of claim 12, further comprising providing, by the federated directory management computer system, a message to at least one of the two different users to change the public token to resolve the data collision.

15. The method of claim 10, wherein the request for the fund transfer is received from a third party query receive directory, the method further comprising:
providing, to the third party query receive directory, a response message including information regarding the payee from the uniform database.

16. A federated directory management computer system communicably and operatively coupled to two or more different peer-to-peer payment directories, the federated directory management computer system comprising:
a processing circuit including at least one processor coupled to at least one memory storing instructions that, when executed by the at least one processor, cause the processing circuit to perform operations comprising:
receiving data from each of the two or more different peer-to-peer payment directories;
normalizing the received data to create a uniform database by:
converting at least a first portion of the received data into a uniform file type and excluding a second portion of the received data, the second portion of the received data ineligible for conversion to the uniform file type; and
providing the converted first portion of the received data to the uniform database and refraining from providing the second portion of the received data to the uniform database, the converted first portion of the received data provided to the uniform database according to a categorization based on a characteristic of the uniform file type;

identifying a data collision involving the normalized received data within the uniform database, the data collision including a data collision type;

resolving, based on the data collision type and according to at least a first predefined rule stored by the processing circuit, the data collision;

receiving a request for a fund transfer to a payee;

determining, based on the request, that the fund transfer is either an interdirectory transfer or an intradirectory transfer;

identifying, based on the determination and according to at least a second predefined rule stored by the processing circuit, a payment rail for the fund transfer; and processing the fund transfer via the identified payment rail.

17. The federated directory management computer system of claim 16, wherein the instructions, when executed by the at least one processor, cause the processing circuit to perform operations further comprising:

deactivating a public token associated with a user in response to the identified data collision indicating that the user and another user are each associated with the same public token according to the first predefined rule to resolve the data collision.

18. The federated directory management computer system of claim 16, wherein the instructions, when executed by the at least one processor, cause the processing circuit to perform operations further comprising:

deactivating a public token associated with a user in response to the identified data collision indicating that the user and another user are each associated with the public token according to the first predefined rule to resolve the data collision.

19. The federated directory management computer system of claim 16, wherein the received data includes public tokens associated with each member of each directory.

\* \* \* \* \*